US006954903B2

(12) United States Patent
Richard

(10) Patent No.: US 6,954,903 B2
(45) Date of Patent: Oct. 11, 2005

(54) PROCESS FOR AUTOMATICALLY DISPLAYING GRAPHICAL OBJECTS SUCH AS BUTTONS IN A WEB PAGE

(75) Inventor: Bruno Richard, Crolles (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 399 days.

(21) Appl. No.: 09/883,725

(22) Filed: Jun. 18, 2001

(65) Prior Publication Data

US 2002/0011970 A1 Jan. 31, 2002

(30) Foreign Application Priority Data

Jun. 19, 2000 (EP) .......................................... 00410061

(51) Int. Cl.$^7$ ................................................ G09G 5/00
(52) U.S. Cl. .................................................... 715/760
(58) Field of Search ................................ 345/760, 762, 345/764; 715/501.1, 513, 517–519, 760, 762, 763, 764

(56) References Cited

U.S. PATENT DOCUMENTS

| 5,421,009 | A |   | 5/1995  | Platt .......................... 395/600 |
| 5,491,796 | A |   | 2/1996  | Wanderer et al. ...... 395/200.09 |
| 5,845,299 | A | * | 12/1998 | Arora et al. ................. 715/513 |
| 5,860,012 | A |   | 1/1999  | Luu ........................... 395/712 |
| 5,948,055 | A |   | 9/1999  | Pulsipher et al. ........... 709/202 |
| 5,986,654 | A | * | 11/1999 | Alexander et al. .......... 345/744 |
| 6,300,947 | B1| * | 10/2001 | Kanevsky ................... 715/866 |
| 6,639,611 | B1| * | 10/2003 | Leduc ........................ 345/764 |

FOREIGN PATENT DOCUMENTS

| DE | 198 43 324 A1 | 3/2000 |
| EP | 0 710 914 A1  | 5/1996 |
| EP | 0 998 076 A1  | 5/2000 |
| JP | 08106536      | 4/1996 |
| WO | WO 99/26169   | 5/1999 |

OTHER PUBLICATIONS

LeJeune, Urb, "HTML 3.0 Table Tutorial," *HTML Table Tutorial*, URL:www.charm.net/(lejeune/tables.html (Sep. 19, 1996).
"Efficient 3D Buttons in Dynamic Hyper Text Markup Language Pages," *IBM Technical Disclosure Bulletin, U.S.*, IBM Corp. New York, vol. 41, No. 1, pp. 695–698 (1998).
"Objects, Images and Applets in HTML Documents," *W3C HTML 4.01 Specification*, URL:www.w3.org/TR/html401/struct/objects.html, (Dec. 24, 1999).
Bier, Eric A., "EmbeddedButtons: Documents as User Interfaces," *ACM Symposium on User Interface Software and Technology, U.S.*, pp. 45–53, (Nov. 11, 1991).
Hudak–David, G., "A Beginner's Guide to HTML," *National Center for Supercomputing Applications (NCSA)*, URL:www.ncsa.uiuc.edu/General/Internet/WWW/HTML-PrimerPDF.pdf (Jan. 1997).

* cited by examiner

*Primary Examiner*—Kristine Kincaid
*Assistant Examiner*—Thanh Vu

(57) ABSTRACT

A process for displaying a composite object in a markup language page, which comprises at least two cells with a first cell containing an image and a second cell containing a textual information. The at least two cells are arranged in a table for the purpose of building a composite image wherein said textual information can be separately modified. Each cell is associated with different files in order to produce a composite image having different states in accordance with the position of the cursor relative to said object. A first state—the normal state—corresponds to a first file. A second state corresponds to a second file for a state where the cursor is moving over the object. At last a third file is used for a third state which corresponds to the selection of the object by the cursor.

5 Claims, 9 Drawing Sheets

PROCESS FOR AUTOMATICALLY DISPLAYING GRAPHICAL OBJECTS SUCH AS BUTTONS IN A WEB PAGE

TECHNICAL FIELD OF THE INVENTION

The invention relates to telecommunications and more particularly to a process for automatically creating, maintaining and displaying graphical objects such as graphical buttons which are contained in a web page.

BACKGROUND ART

The constant progress of the technology of information and that of the communication systems, particularly with the explosion of the Internet and Intranet networks, has resulted in the development of an era of information. With one single server, It is now possible for any individual or company to provide a substantial information which can be worldwide distributed, thanks to the possibilities provided by the Hypertext Markup Language (HTML) possibilities.

As the availability of the information constantly increases, the latter also needs to be more and more updated. It is a general wish to easily create and maintain the information which is provided through the Internet network and which is received in the HTML pages transmitted by the web sites. Generally speaking, the design team of a web site comprises different specialists, including a graphical designer co-operating with the other members of the design team. These are the conditions of a valuable and attractive information which is provided to the potential web site visitors. The graphical designer particularly creates and maintains the different graphical objects, such as the graphical buttons, the images etc. . . which are involved in the HTML pages. He also handles the different aesthetic aspects forming the valuable "look and feel" of the web site. In order to facilitate their work, the graphical designers make an extensive use of graphical edition software which allow them to create and maintain the different graphical objects which are displayed in the HTML pages. The multi-layer editing technique shows to be very useful in that respect since it permits to easily separate the layer carrying the textual information from the other layer(s) which are more dedicated to the aesthetic aspects of the HTML page. In spite of the great help which is provided by those tools, it is clear that the edition of one particular object included in one page inevitably involves the edition of the graphical images themselves, and thus results in additional work for the graphical designer. In most cases, the graphical designer will have to open the image files corresponding to the object which has to be edited, for instance a graphical button which textual information needs to be translated in another language. This inevitably results in a longer development time and higher development costs.

The development of HTML specific tools and the extensive use of the so-called server side extensions may improve the situation since it is the server which receives the function of managing the graphical buttons which are incorporated in a HTML page. More precisely, the server which is fitted with the server side extensions, as defined by Microsoft (TM), has the role of producing the graphical buttons in association with the textual information defined by the web site designers. It is easier for them to edit the different HTML pages since they have only to define the type of the buttons which are to be incorporated within the HTML pages. The server then produces upon demand the HTML pages when those are requested by a web visitor. However, the technique is clearly not applicable everywhere since many servers are not fitted with the server side extensions. In many situations, the web designers are compelled to design the HTML pages and to manage the different image files for the different graphical objects and buttons, particularly when it is necessary to amend the textual information which is therein included.

It is clear that the creation and the edition of the image files tend to become a burden for web site designers. This is much more relevant when considering the fact that, generally speaking, each graphical object which is to be displayed in one HTML page involves three different image files associated to three distinctive states of the object. A first state corresponds to the normal object or button which is displayed to the user. A second state, so-called "onhover", corresponds to the new image—generally highlighted—which is displayed when the cursor is moving over the object. At last, a third file corresponds to the "selected" state, i.e. the image which is displayed upon selection by the user i.e., when a button object is pressed for instance. Therefore, it appears that even for a very simple HTML page, a great number of different graphical objects have to be managed, i.e. created and updated by the web designers. When a multi-lingual web site needs to be arranged, this might increase substantially the number of graphical images to handle.

In addition, it should be noticed that since most HTML pages tend to become more and more sophisticated, from an aesthetic point of view, (what correlatively increases much more the size and the number of the image files to be downloaded), the difficulty of analysing the HTML page and accessing the textual information is also increased. Indeed, it may be useful to possibly enhance the textual information within the HTLM page, for the convenience of some web users with reduced visual capacities, but also for the numerous automatic searching process which are executed in the automatic scanning systems, such as those known under the familiar name of "web crawlers" or "spiders". When the textual information is incorporated within a file image, and not directly accessible in ASCII form, this might hinder the searching or scanning process. The use of the ALT properties of the graphical objects is sometimes favoured since it may provide an alternative way for associating a textual information to an image file, provided that such an additional information has been introduced in the ALT properties of the image file. As known by the skilled man, the ALT properties are used for displaying a particular textual information to the user when the latter overlies the cursor on a particular object. When the web designers incorporate into the ALT properties of an object the definition or a short explanation of the considered image, that definition or explanation can be accessed by the automatic web crawler for the purpose of indexing the image. It is however clear that a direct access to the meaning of a button or to the textual information associated to one graphical object is always preferable.

Obviously, one could reconsider the opportunity of incorporating sophisticated graphical images for the purpose of allowing the automatic scanning system a direct access to the textual information associated to the hyperlink. However this possibility is not feasible in view of the strong success of the aesthetic web site and the enthusiastic demand of visitors for those.

It is therefore a general wish to facilitate the creation and the maintenance of the different graphical objects which are associated with textual information, such as the hyperlink buttons. The edition of those objects should be made possible within the frame of the HTML page in order to minimise any implication of the graphical designer and the use of additional graphical edition tool. Not only this implication should be minimised—thus entailing a cost reduction.

Additionally, it is desirable to reduce the size of the files which are included within the HTML pages, while preserving the general "look and feel" of the pages. It is also required that the HTML pages are interpreted and displayed by any HTML web browser, even of the earlier generation.

At last, it is desirable that the HTML pages still support the automatic analysis and search processes which are carried out by the automatic scanning systems. The user should also be allowed to deselect the downloading of the image files in the web browser settings, and still be capable of navigating through the HTML pages.

SUMMARY OF THE INVENTION

It is an object of the present invention to provide a very simple way of creating and updating HTML pages which comprise graphical objects, such as graphical buttons.

It is another object of the present invention to reduce the size of the images which are contained into the HTML pages for the purpose of accelerating the downloading process and, eventually, for reducing the costs of operation of the server hosting the web site.

It is another object of the present invention to provide a method to automatically size the graphical objects used in an HTML page.

It is a further object to provide a method for displaying graphical objects on an HTML page, which objects are automatically aligned and positioned and displayed by the web browser, even of an early generation.

It is still a further object of the present invention to provide a method for displaying graphical objects which facilitates the searching process of the scanning systems.

It is still another object of the present invention to provide a compression method which is adapted to reduce the size of the image files involved by the graphical objects and buttons which are incorporated in a HTML page.

These and other objects are provided by the processes which are defined in the independent claims.

Basically, there is provided a process for displaying a composite object in a markup language page, which comprises at least two cells with a first cell containing an image and a second cell containing a textual information. The at least two cells are arranged in a table for the purpose of building a composite image wherein said textual information can be separately modified.

In one embodiment, each cell is associated with different files in order to produce a composite image having different states in accordance with the position of the cursor relative to said object. A first state—the normal state—corresponds to a first file. A second state corresponds to a second file for a state where the cursor is moving over the object. At last a third file is used for a third state which corresponds to the selection of the object by the cursor.

Alternatively, there is provided a process for analysing an image file for the purpose of generating a set of derived files, having a smaller size, and which can be directly used for automatically generating graphical objects, such as graphical buttons, within a HTML page. The process performs a decomposition of the image by means of a search of the variant and invariant portion of a determined graphical object. More particularly, the process generates a set of eight image files, four corresponding to the four different corners, and four addition image files respectively corresponding to two vertical top and bottom slices of the graphical object, associated with two horizontal left and right slices of the considered button.

Since the size of the eight files is lower than that of the original buttons, a substantial compression effect is achieved. Additionally, the same files may be used for generating multiple different objects including different textual information.

By associating the eight different files with the properties of the HTML tables, there is provided a new concept of "table" buttons, i.e. a process for automatically generating graphical buttons in HTML pages without need of any additional graphical edition tool. Each graphical button which is to be constructed is based on a 3×3 table having a specific set of attributes. The updating of the HTML pages is immediate, as well as the searching process executed by the scanning system, since the textual information is coded in ASCII format.

For the purpose of generating a set of automatically aligned and positioned objects, which are easily editable, the process takes advantage of the properties of the HTML table and allows an easy construction of an HTML page which contains a set of vertically aligned or horizontally aligned buttons which can be read by any web browser, even of the early generation. The different subfiles of the buttons are arranged in a set of tables, based on 3×3 cells, with the middle comprising the textual information to be incorporated within the considered graphical button. The different buttons are automatically aligned on the surface of the screen and, further, the edition of the textual information assigned to one particular graphical button is rendered possible and immediate. Moreover, when the edition of one graphical object tends to incorporate a larger textual information, or when the user changes the font of the text, the whole set of graphical objects is automatically reformatted and resized, thanks to the properties of the HTML tables, and a new set of re-aligned graphical buttons is automatically provided without effort for the web designer. Further the management of the different pages, from one language to the others, appears immediate and very simple.

Therefore, the invention takes advantage of the properties of the tables in the HTML format for the purpose of creating a new graphical object, very useful for creating graphical buttons. The aesthetic aspects of the buttons are clearly separated from the textual information, what guarantees the possibility to easily edit the button when there is a need for doing so. The edition of the textual information is directly executed within the frame of the HTML page, and there is no need of an additional graphical edition tool. Further, since the textual information which is incorporated within the graphical button is coded in ASCII form, this substantially facilitates the handling of the latter, for instance by the automatic scanning systems.

Alternatively, the invention provides a process for translating an HTML page which comprises graphical objects of images based on image files. The different graphical objects are decomposed for the purpose of providing a derived set of eight subfiles. The HTML page is then reconstructed and can be accessed via the Internet network and the new organisation allows a quicker downloading time particularly useful when the navigation speed is reduced. In some cases, the browser receiving the HTML pages may even reformat it by using files which are already stored within the user machine. Therefore, only the basic textual information needs to be exchanged through the server and the user's equipment and all the user may change the look and feel of the presentation of the information. The invention may be applicable for allowing a user's terminal to receive HTML pages from a server communicating via a Wireless Application Protocol (WAP) network.

In such a case, a new HTML tag could be defined, such as «NAVOBJECT». Instead of sending the images and HTML code required to handle a Home button's look and feel, the HTML page would simply contain the «<NAVOBJECT face=»Home»> code, which would result in a «Home» button being drawn automatically by the browser, based on some internal look and feel parameters, this could be applied to any button name, replacing the "Home" text by the appropriate name for the button.

DESCRIPTION OF THE DRAWINGS

An embodiment of the invention will now be described, by way of example only, with reference to the accompanying drawings, wherein.

DESCRIPTION OF THE PREFERRED EMBODIMENT OF THE INVENTION

Figure 1:
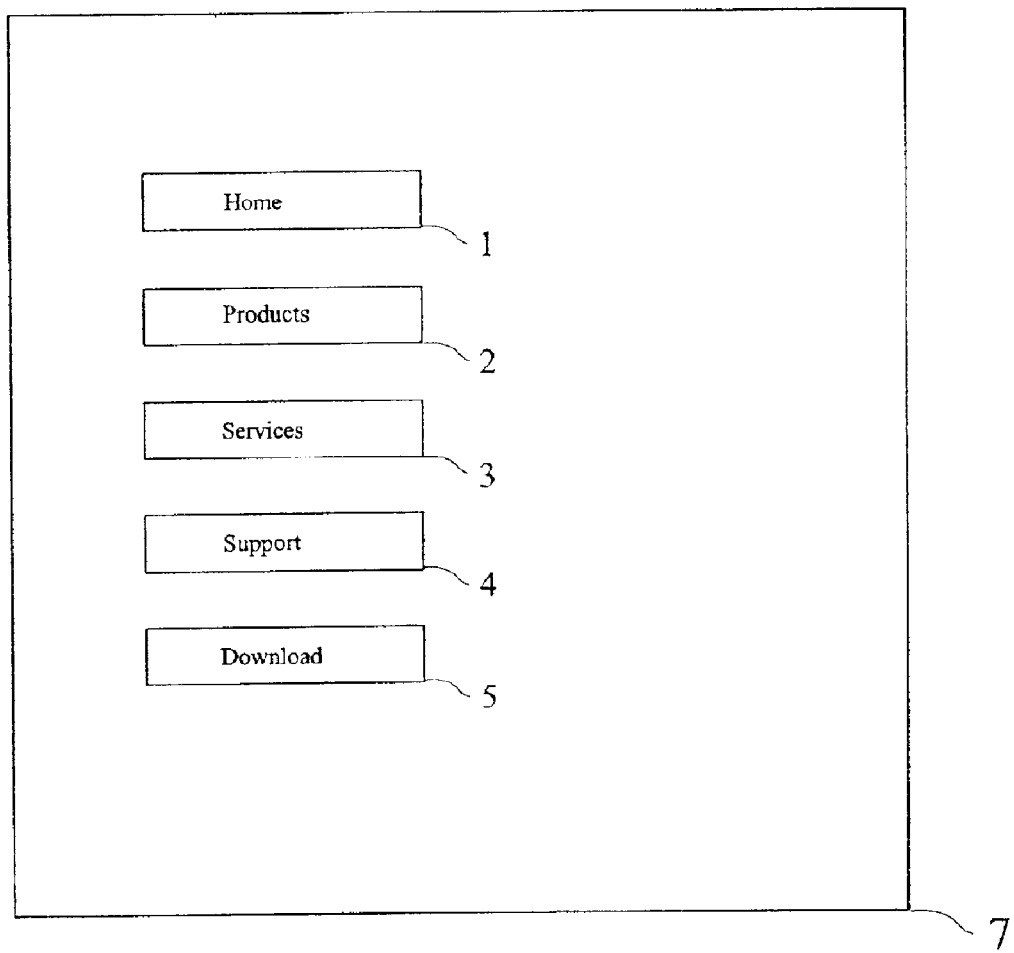
FIG. 1 illustrates an example of a set of graphical objects, such as a button which can take advantage of the present invention.

With respect to the FIG. 1 there is represented an example of a basic HTML page which can take advantage of the decomposing process which will be described below. The HTML page which is illustrated comprises a set of five graphical objects, or buttons which are displayed on a screen 7 and which provide hyperlinks to other HTML pages. A first graphical object 1 is dedicated to provide an hyperlink to a "home" HTML page. Similarly a second object 2, a third object 3, a fourth object 4 and a fifth object 5 are respectively assigned to load a corresponding "Products", "Services", "Support", and "Download" HTML Page.

As it appears in the figure, all the graphical objects or buttons 1–5 are aligned and should normally reveal the same "look and feel". However, since those buttons carry a different textual information, the downloading of the full HTML page generally requires the successive downloading of the five graphical objects, thus increasing the downloading time. Each graphical button may further involves three distinctive image files, for handling the three different possible states of one graphical button, what still increases the time required for downloading the page.

The process which will be described below permits to substantially decrease the size of the files which need to be downloaded for displaying the HTML page. Additionally, the downloading time is reduced much more since the same image files can be used for the different buttons.

Figure 2A:
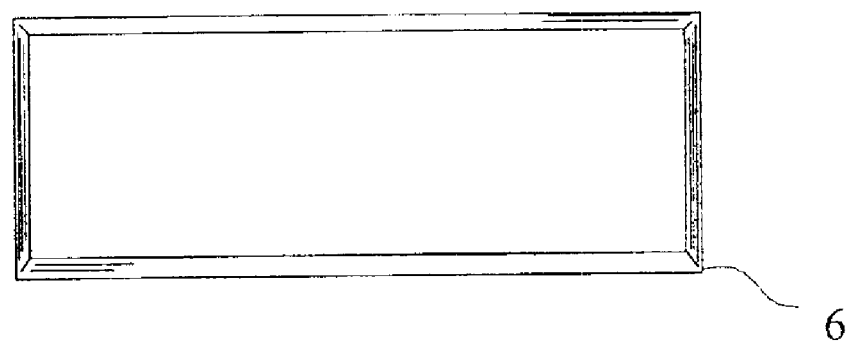
FIGS. 2A and 2B illustrate a front view of an example of an graphical object embodying a button.
Figure 2B:
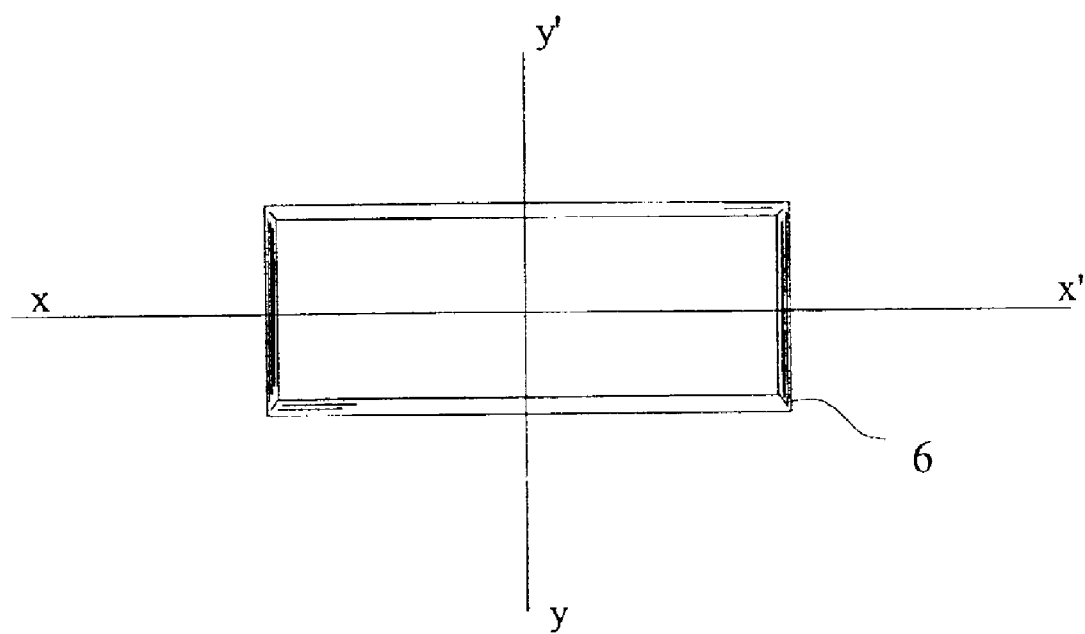
Figure 6:
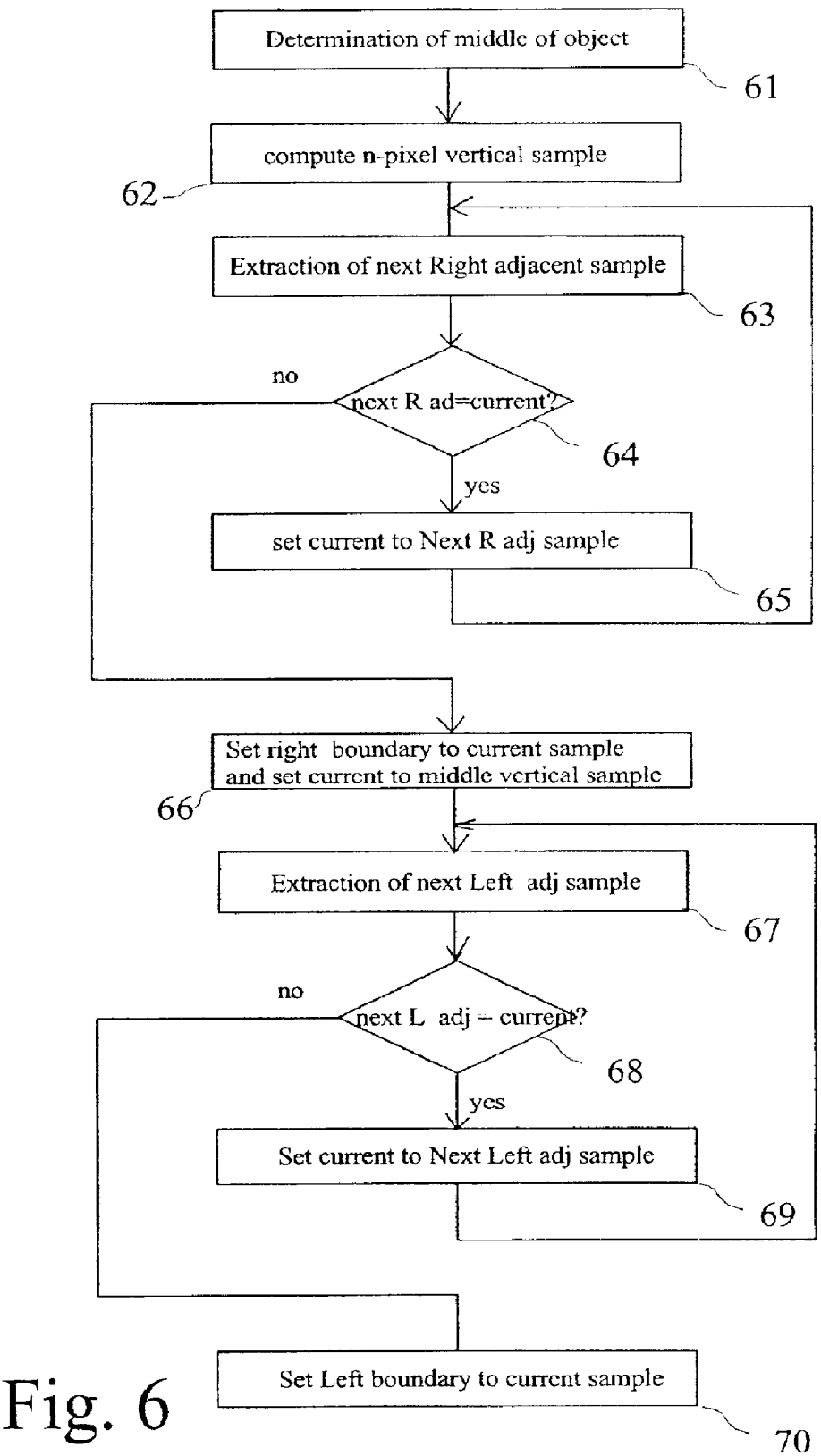
FIGS. 6 and 7 are flow charts illustrating the process of analysing an original image file for the purpose of deriving 8 subfiles associated to the image portions shown in FIG. 5B.

An example of a graphical button 6 is schematised in FIGS. 2A and 2B. A specific process is used for searching the invariant and variant portions of the graphical button 6, based on a x–x' and y–y' decomposition, as represented in FIG. 2B. To achieve this, two successive processes are involved which will be now described with more details in reference with FIGS. 6 and 7.

The process starts with a first step 61 which corresponds to the determination of the middle of the graphical object which is to be analysed.

Figure 3A:
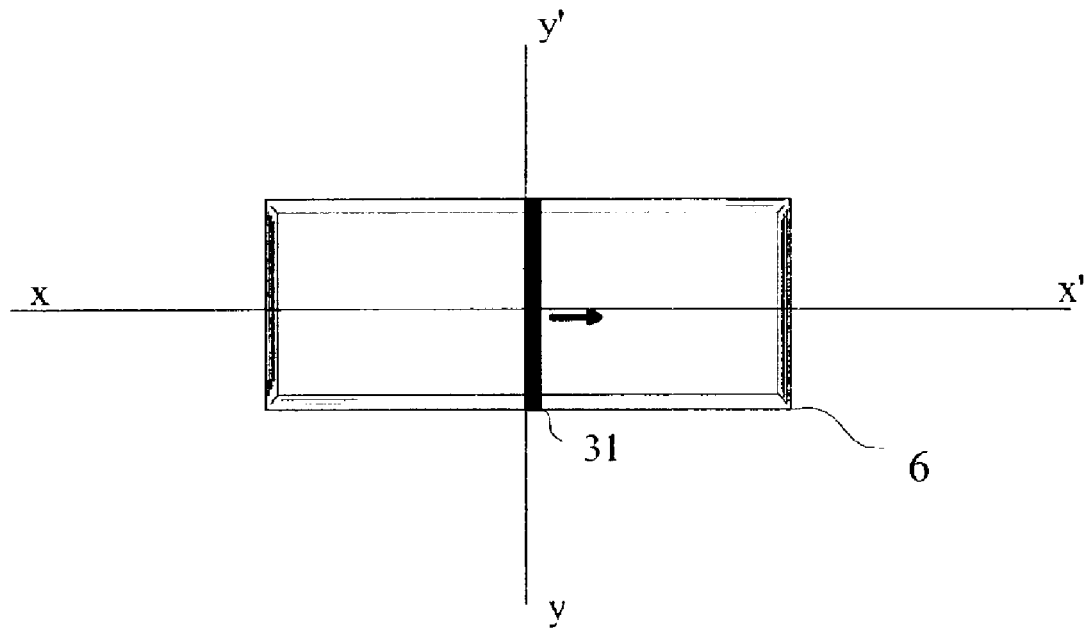
FIGS. 3A and 3B illustrate the process for determining the right variant portions of the graphical image.

Then, a step 62 is initiated for performing a first vertical sampling in order to extract a n-pixel wide sample of the button. That vertical sample or slice is illustrated in FIG. 3A with the block 31. A digital representation of that vertical sample is being computed and within the RAM memory or in a file stored within the memory storage. In the preferred embodiment of the invention, each pixel of the vertical sample 31 is coded by means of a 24 bytes code representing the three Red-Green-Blue colours.

In step 63, the process enters into a loop which consists in extracting the next right adjacent sample and deducing a digital representation of the latter.

The latter is then compared, in step 64, to the digital representation of the current vertical sample.

If the two values stored within the memory appear to be equal, then the next adjacent sample is assigned the role of the current one in step 65, and the process loops back to step 63.

Figure 3B:
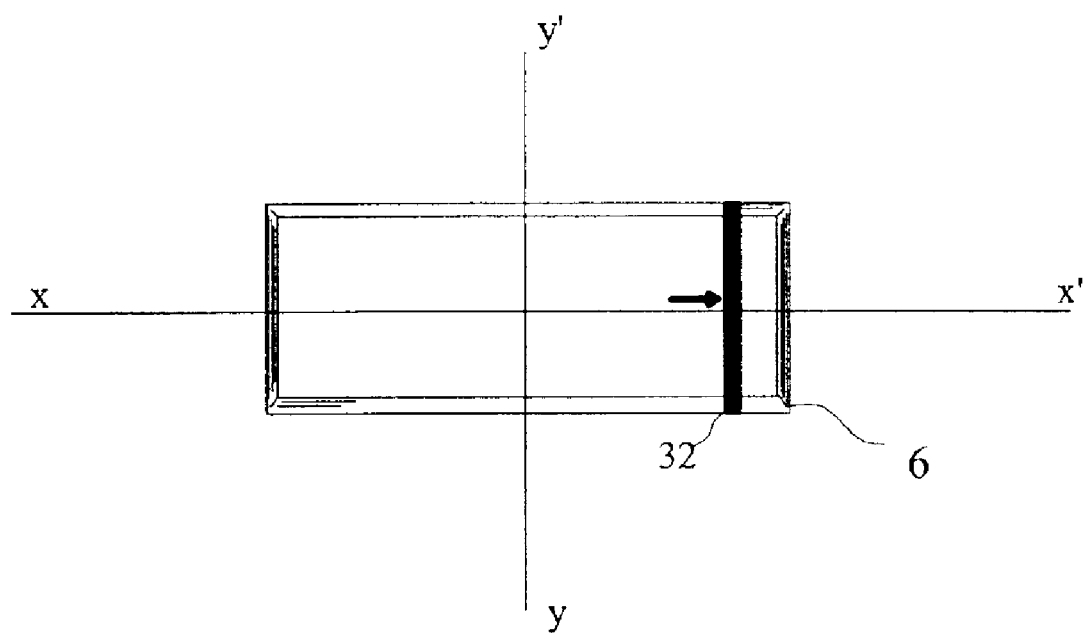

If the next adjacent vertical sample appears to be different from the current sample—illustrated by block 32 in FIG. 3B, then the process sets the position of the vertical right border in step 66 by determining a boundary line 51 which separates the invariant and the variant right portions of the graphical button. Step 66 then completes with the setting of the current value to the middle vertical sample again.

The process then proceeds with the determination of a left vertical boundary line 52 of the variant-invariant separation. To achieve this, the process enters in step 67 into a loop which consists in extracting the next adjacent sample on the left.

In step 68, the digital representation of the latter is then compared and, if the two samples appear to be equal, the next left adjacent sample is assigned the role of the current value in step 69 and the process loops back to step 67 again.

If the next adjacent vertical sample appears to be different, this limits the left boundary between the invariant and the variant portions of the image, as illustrated by reference 52 in FIG. 5 and the process sets that boundary in step 70.

Figure 4A:
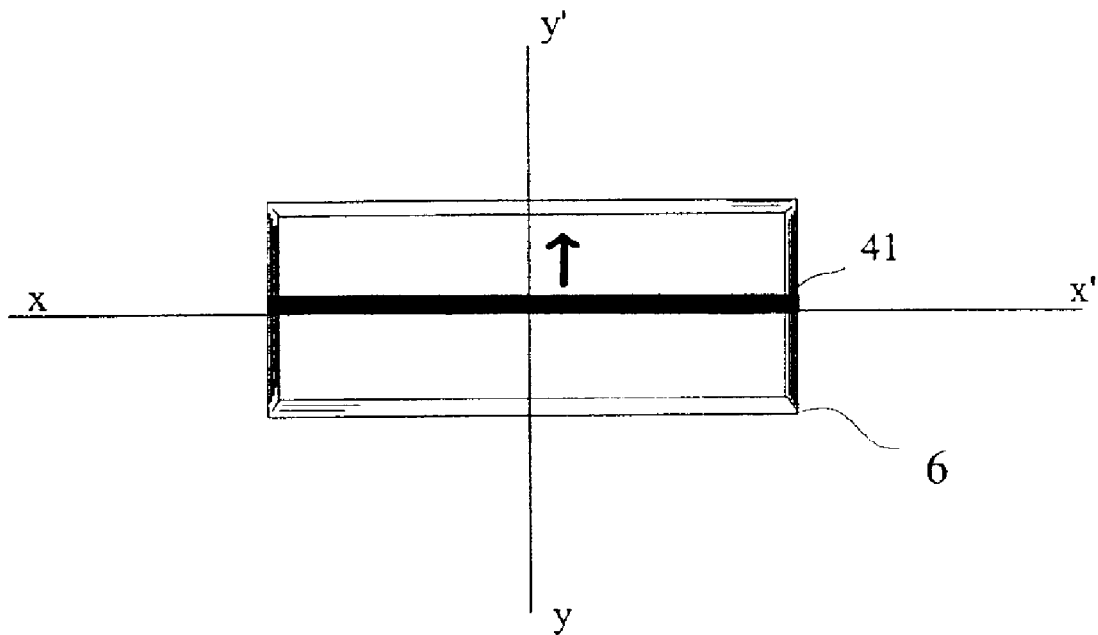
FIGS. 4A and 4B illustrate the process for determining the top variant portions of the graphical button.
Figure 5A:
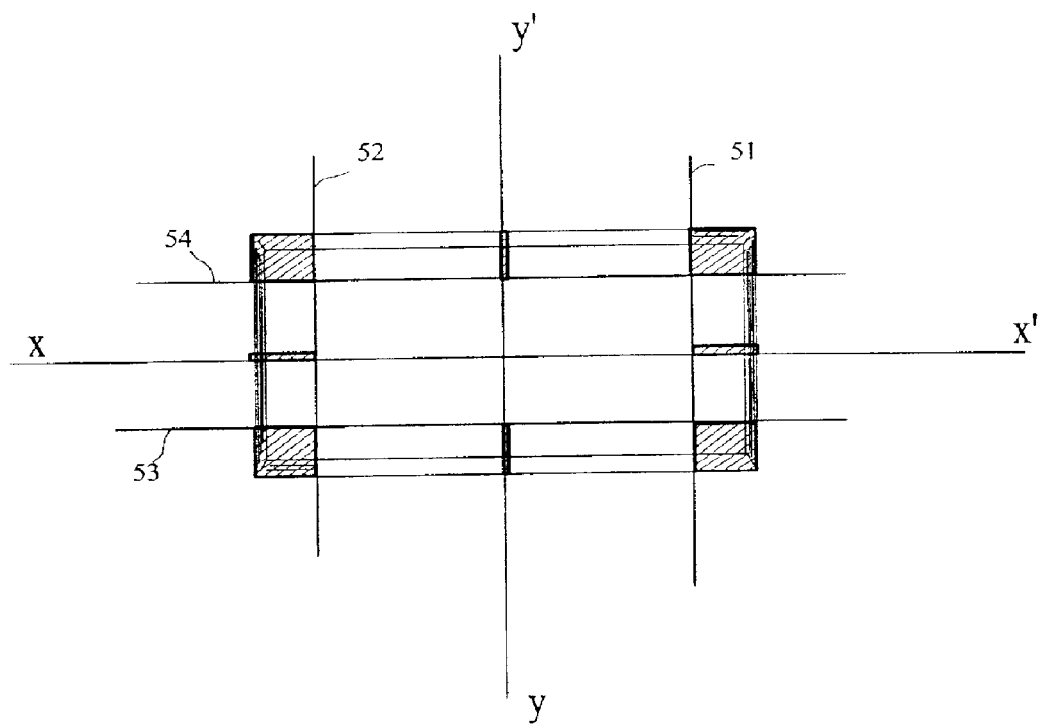
FIGS. 5A and 5B illustrate the decomposition of the original graphical button for the purpose of deriving a set of eight elementary image files.
Figure 7:
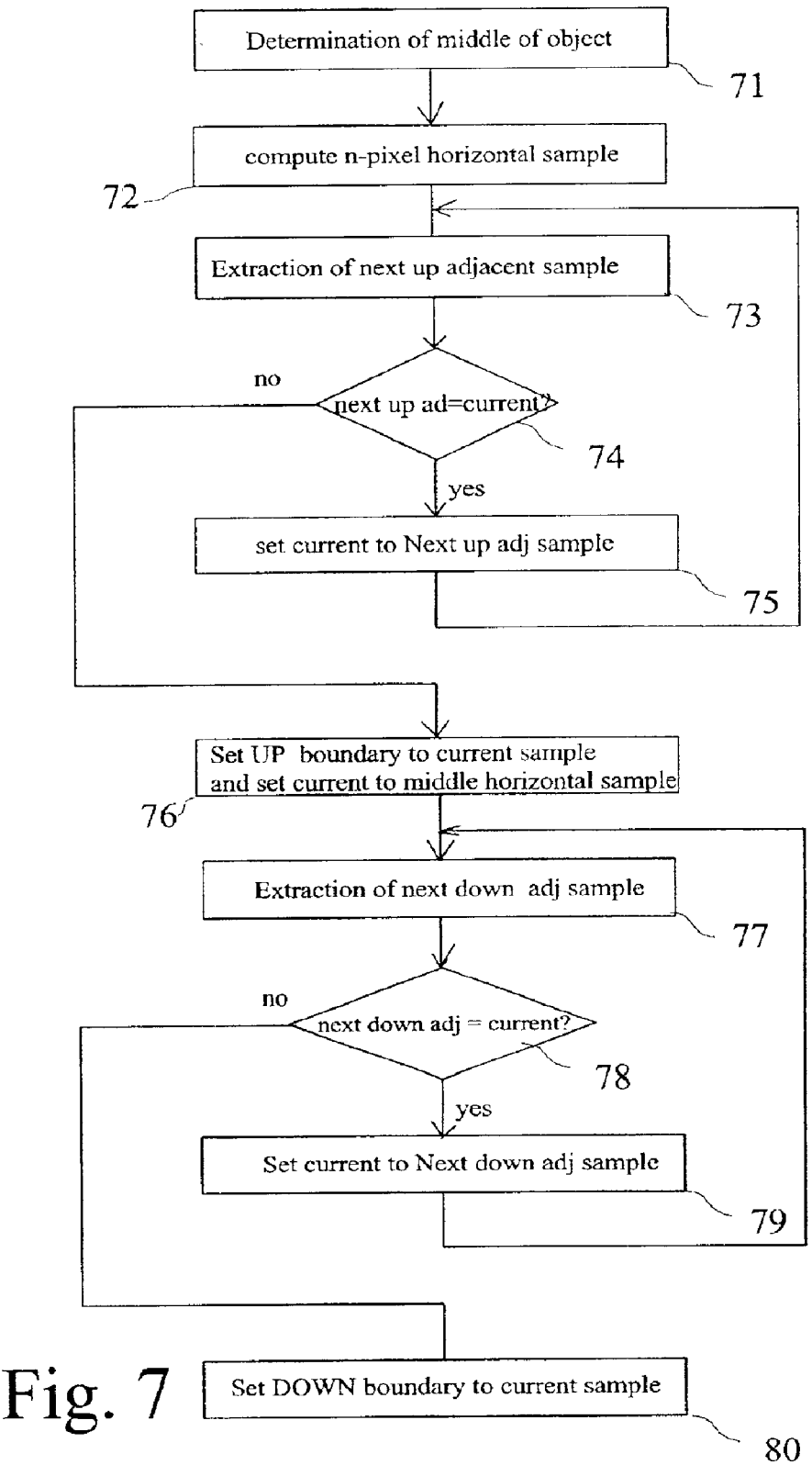

The process then proceeds with the next sequence for the purpose of determining the superior or top boundary 54 and the inferior or bottom boundary 53, as illustrated in FIG. 5A. Briefly, this process is illustrated in FIG. 7. The determination of the middle of the object, in step 71, is followed by the computation of an horizontal sample (such as represented by block 41 in FIG. 4A).

Figure 4B:
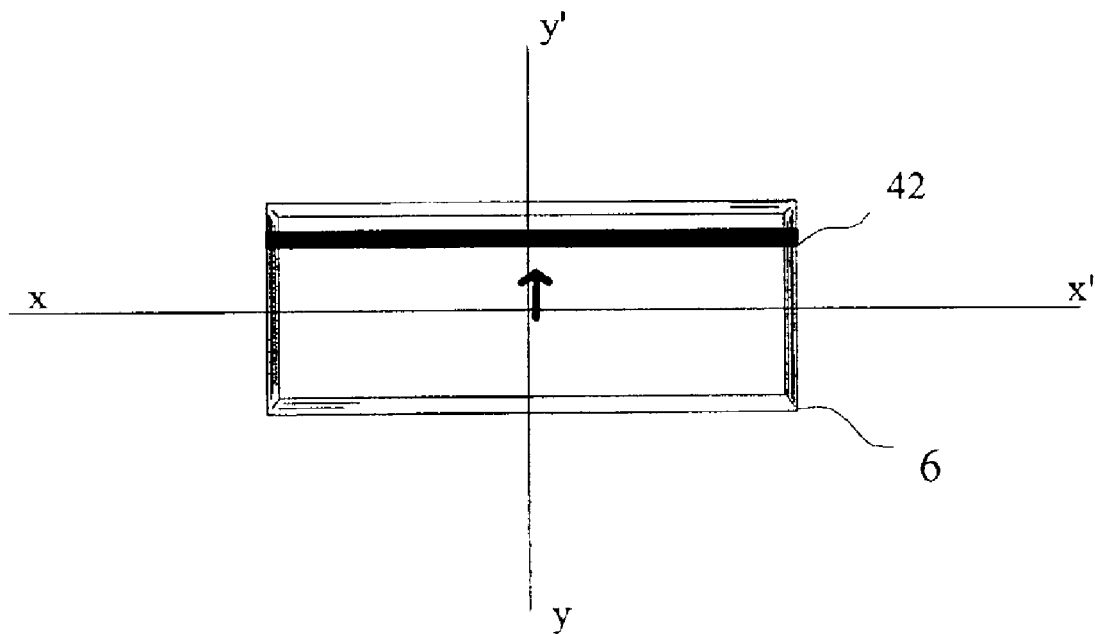

The process then enters a loop where the next adjacent up horizontal sample is computed and stored within the memory. A comparison is performed, followed by a test step 74 to determine whether the two values are equal. If the two values are equal, then the process loops back to step 73 again. However if the current value and the next adjacent up values are different, this is used by the process for delineating the boundary line 54 between the variant and invariant portion of the graphical object, as illustrated by the position of block 42 of FIG. 4B.

Figure 5B:
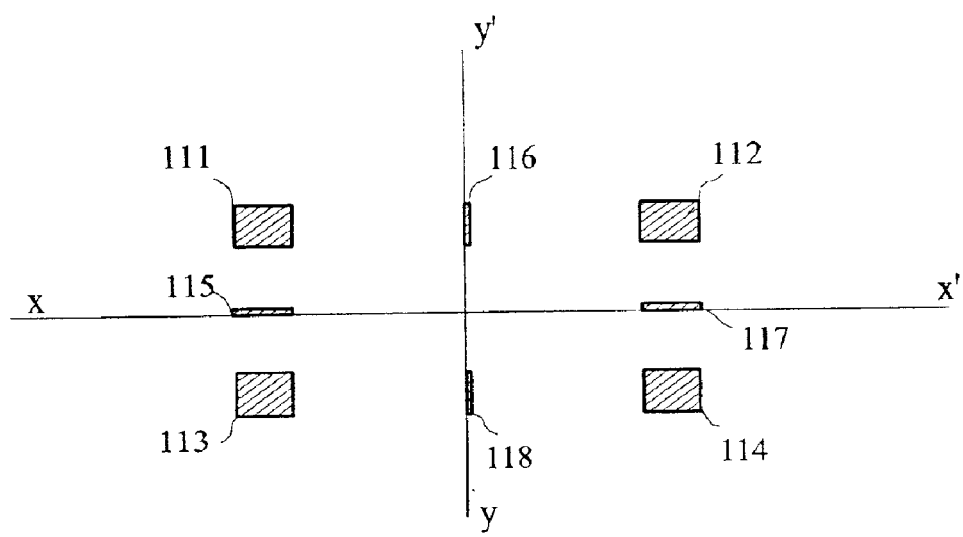

The current value is then set again to the middle horizontal sample, and the process proceeds with the determination of the bottom boundary 53 of FIG. 5B. To achieve this, there is successively executed the extraction of the next Down adjacent sample in step 77, and the loop consisting of the sequence of steps 78 and 79. In step 78, the test is performed to determine whether the next adjacent down value is equal to the current value, and, if so, step 79 assigns the current value to that next adjacent down value before looping back to step 77. On the contrary, if the two values are different, then this is used by the process for setting, in step 80, the bottom boundary line 53 which is represented in FIG. 5A.

The two vertical and the two horizontal boundary lines which were determined above are used for determining a set of eight different portions of the graphical objects 111–118, such as represented in FIG. 5B. Four files 111–114 corresponds to respectively the left top corner 111, the right top corner 112, the left bottom corner 113 and the right bottom corner 114 of the graphical button. Additional four files are used for representing elementary slices of the button: the top vertical sample or slice 116 which corresponds to the upper portion of the vertical slice with respect to boundary line 54; the bottom vertical sample 118 corresponding to the lower part of the vertical slice which is below boundary line 53, the left horizontal sample 115 corresponding to the portion of the horizontal slice located on the left of line 52, and the right horizontal sample 117 corresponding to the portion of the slice located on the right of boundary line 51. These eight files which were derived from the original graphical button will be used for regenerating the graphical object or button in an HTML page, as will be explained below.

Those image subfiles can then be recoded under a gif or jpeg form and incorporated within HTML pages, as will be shown below, for the purpose of providing or easily reconstructing the graphical object upon demand by the user.

It should be noticed that the process which was described above uses a comparison test of the digital representation of the current sample and the next adjacent sample. This comparison can be basically achieved by individually comparing the Red-Blue-Green components of each pixel. In one particular embodiment, it may be advantageous to decide that the comparison succeeds when the difference between the two representation only differ of a predetermined amount of bits per color in order to increase the compression effect. The analysing process uses a comparison of the digital representation of the vertical and horizontal samples which are based on a Red-Green-Blue (24 bytes) representation of the colour. However, this is given only by way of example, and any other representation could be used.

In one embodiment, the process is executed by means of a specific object or component which is used for returning the eight different image subfiles, in gif format for instance, from any pre-existing original image file, being coded in jpeg, in gif or in bitmap. It should be noticed that, while the analysing process has been described for producing images under the gif format, any other kind of formats which are suitable for carrying image may be used.

There will be now described the process for automatically generating a HTML page which comprises a set of graphical objects or buttons which are automatically positioned and sized in accordance with the textual information which will be incorporated and the particular font being used. Additionally, as it will be shown, the edition of the HTML page is substantially facilitated because no graphical edition tool is needed.

The process for automatically displaying a set of buttons is based on the construction of a table having very specific parameters or attributes. In one embodiment, each graphical object or button is represented by a set of 3 rows and three columns forming 9 elementary cells. The HTML table is created with a cellpadding set to zero, a cellspacing set to zero and, at last, a border set to zero.

More precisely, the first cell of the first row is used for displaying the first top left corner of the graphical object determined by the analysis process, i.e. the portion of the button which corresponds to subfile 111 of FIG. 5B.

The second cell of the first row is used for displaying the top portion 116 of the vertical slice, which is located above boundary line 54, and which is automatically resized thanks to the properties of the HTML tables.

The third cell of the first row is used for displaying the right top corner of the image file, i.e. the image file 112 represented in FIG. 5B.

The first cell of the second row is used for displaying the left horizontal slice 115 of the graphical button, which is automatically resized thanks to the HTML table properties.

The second cell of the second row is used for displaying the textual information which is to be incorporated within the considered button. It should be noticed that the web design may use any font for this purpose and may define the background colour of that cell so that the latter matches the background colour of the graphical object.

The third cell of the second row is used for displaying the right horizontal slice 117 derived from the analysis process of the original graphical object. That cell is automatically resized, thanks to the properties of the HTML page.

The first cell of the third row is used for displaying the bottom left corner of the graphical tool, i.e. the portion of the button which corresponds to subfile 113 of FIG. 5B.

The second cell of the third row is used for displaying the bottom vertical slice 118, which is automatically resized thanks to the properties of the HTML tables.

At last, the third cell of the third row is used for displaying the bottom right corner of the image file, i.e. the image file 114 represented in FIG. 5B.

There will be described now a process which allows an automatic generation of a HTML page comprising a set of n buttons which are automatically aligned. The description is used for a set of vertically aligned buttons but the skilled man will straightforwardly adapt the process to a horizontally aligned set of buttons.

Figure 8:
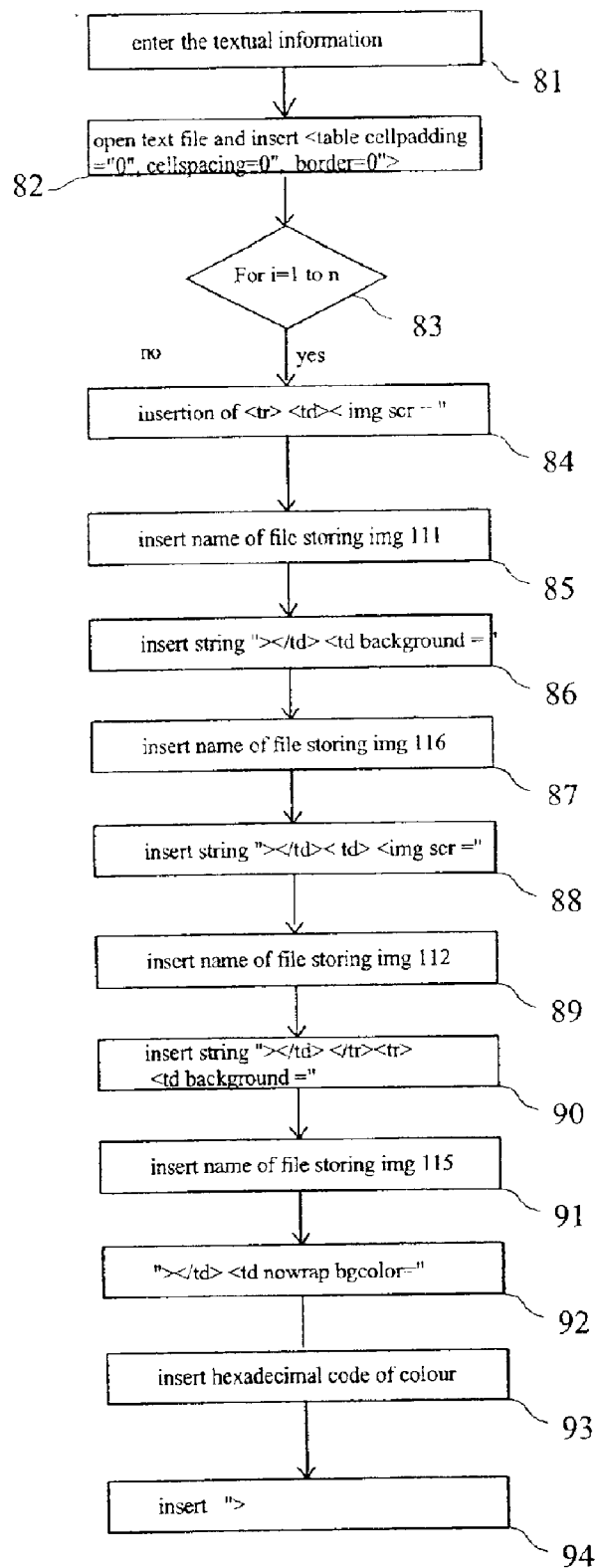
FIGS. 8 and 9 illustrate the process for automatically displaying a set of aligned graphical objects into an HTML page.
Figure 9:
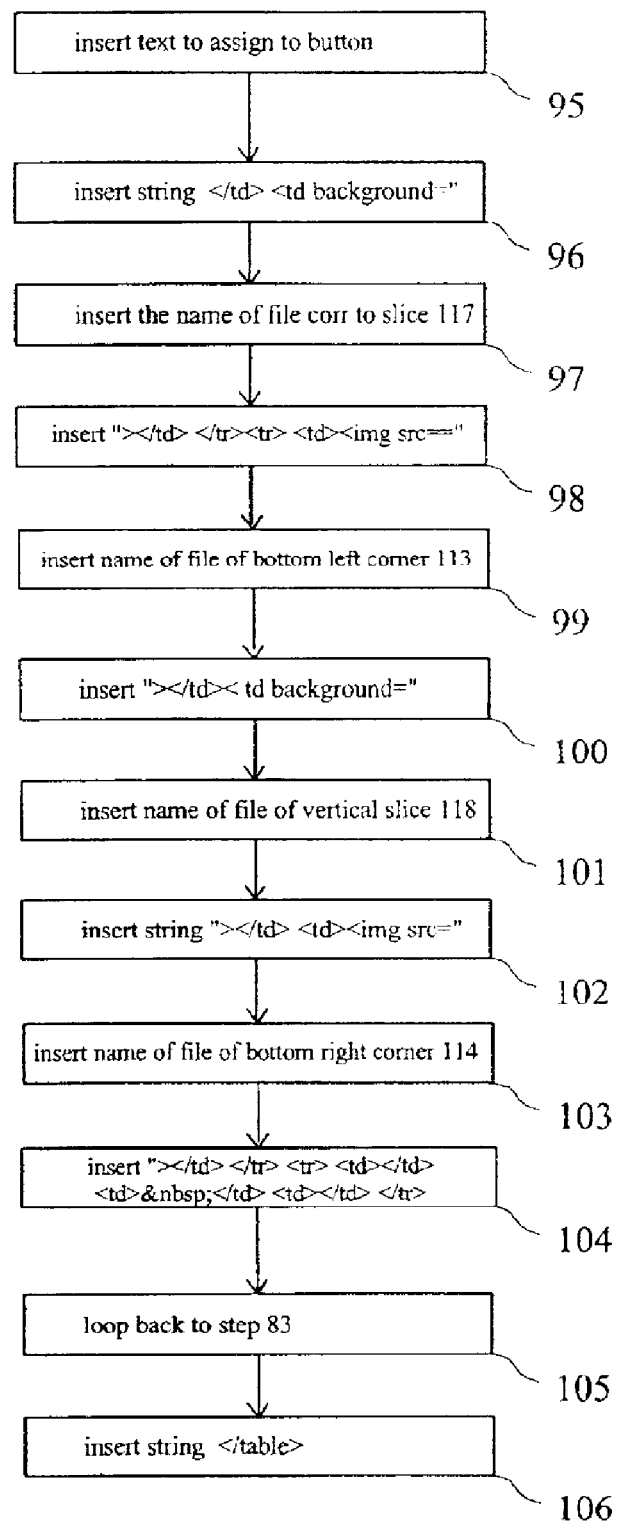

With respect to FIGS. 8 and 9, the process starts with step 81 which the prompting of a dialog box to the user for the purpose of entering the names to be assigned to the different graphical objects. In one embodiment the user also introduces the 24 bits code of the background colour which is to be displayed behind the textual information.

In step 82, the system opens a text file in creating mode and inserts the following string for the purpose of defining the appropriate attributes of the table:

<table cellpadding="0", cellspacing=0", border=0">

In step 83, the process enters into a loop for each graphical object to be displayed (for i=1 to n)n represents the number of objects that will be displayed in the row.

In step 84, the process inserts the following string in the text file:

<tr> <td><img src="

It should be noticed that tr is the table row start, and td stands for the table data start.

In step 85, the process inserts the name of the first file corresponding to the top left corner of the graphical image, i.e. the file containing the portion 111 of the graphical object.

In step 86, the process inserts the following string:
"></td> <td background ="

In step 87, the process inserts the name of the second file which stores the upper vertical slice 116 corresponding to the right top corner of the graphical button.

In step 88, the process inserts the following string
"></td><td><img src="

In step 89, the process inserts the name of the file storing the top right corner 112 of the graphical button.

In step 90, the process inserts the following string:
"></td> </tr><tr> <td background ="

In step 91, the process inserts in the text file the name of the file storing the left slice 115.

In step 92, the process inserts the following string
"></td><td nowrap bgcolor="

In step 93, the process inserts the hexadecimal code of the colour of the background of the second cell of the table.

In step 94, the process inserts the string:
">

In step 95 the process inserts the text to be incorporated in the considered buttons, and which was captured in step 81.

In step 96, there is inserted the following string:
</td> <td background="

In step 97, the process inserts the name of the file which stores the portion of the horizontal slice which is located on the right of line 51, ie slice 117.

In step 98, the process inserts the string:
"></td> </tr><tr> <td><img src=="

In step 99, the process inserts the name of the file which stores the bottom left corner 113 of the graphical button.

In step 100, the process inserts the following string
"></td><td background ="

In step 101, the process inserts the name of the file which stores the portion of the vertical slice 118 which is located below the line 53.

In step 102, the process inserts the string:
"></td> <td><img src="

In step 103, the process inserts the name of the file which stores the bottom right corner 114 of the graphical button.

In step 104, the process inserts the string
"></td> </tr> <tr> <td></td> <td> </td> <td></td> </tr>

In step 105, the process loops back to step 83.

In step 106, the process completes with the final string:
</table>

The process which was described above produces a set of graphical buttons which are automatically arranged and aligned, thanks to the properties of the HTML table. In one embodiment a height of 6 pixels is used for separating the different graphical buttons.

Further, it should be noticed that the technique described above may be easily adapted for achieving the construction of graphical buttons having three different states: normal, onhover and selected states. This only requires the adaptation of the HTML tables which is beyond the skill of the man versed in the art.

In one particular embodiment, the process for automatically creating a set of graphical buttons can take advantage of the use of a script which will automatically follow the process described above, creating the 12 table cells necessary for each object just by calling one function. In such a case, the <head> section of the HTML document would contain the function declaration and necessary code, and the <body> section of the document will only require a simple function call for each object creation, passing the object text as parameter.

Such a script may show as follows:

```
<html>
<head>
<title>TableButton sample</title>
<script language="javascript">
function NewButton(text)
{
document.write('<tr><td><img SRC="bluebutton_LT.gif"></td>');
document.write('    <td BACKGROUND="bluebutton_MT.gif"></td>');
document.write('    <td><img SRC="bluebutton_RT.gif"></td></tr><tr>');
document.write('    <td BACKGROUND="bluebutton_LM.gif"></td>');
document.write('        <td NOWRAP><a href="index.htm"><font face="tahoma" size="4">');
document.write(text);
document.write('</font></a></td>');
document.write('    <td BACKGROUND="bluebutton_RM.gif"></td>');
document.write('    </tr><tr>');
document.write('    <td><img SRC="bluebutton_LB.gif"></td>');
document.write('    <td BACKGROUND="bluebutton_MB.gif"></td>');
document.write('    <td><img SRC="bluebutton_RB.gif"></td>');
document.write('    </tr><tr>');
document.write('        <td background="transparent.gif"  colspan="3"><font size="1"><br></font>');
document.write('    </td></tr>');
}
</script>
<style type="text/css">
    A:link      { color:white; text-decoration: none }
    A:visited   { color:white; text-decoration: none }
    A:hover     { color:red; text-decoration: none }
</style>
</head>
<body bgcolor="white">
<table cellpadding="12" cellspacing="0" valign="top">
  <tr>
    <td valign="top"> <img alt="HP Labs Grenoble" border="0"
```

-continued

```
src="hplglogo.gif"><br>
  <br> <br> <br>
  <table  CELLSPACING="0"  BORDER="0"  CELLPADDING="0"  ALIGN="left"
  BGCOLOR="blue">
  <script language="javascript">
    NewButton("Home");
    NewButton("What's new");
    NewButton("Products");
    NewButton("Services");
    NewButton("Support");
    NewButton("Download");
    NewButton("Buy now!");
  </script>
  </table>
  </td>
  <td valign="top">
    <h1>HTML Table Buttons - Script example</h1>
    <p>
    This example shows how the mechanism can be applied using a script. The
    call to the NewButton( ) function automatically builds each button.
    </p>
  </td>
 </tr>
<table/>
<body/>
<html/>
<!— First table contains the menu items on left, content on right —>
```

What is claimed is:

1. Process for decomposing an image of a graphic object to be displayed within a Hyper Text Markup Language (HTML) page comprising:

(a) computing the middle of said graphic object;

(b) extracting a first vertical sample of n pixel wide, which passes through said middle;

(c) determining the next adjacent sample located on the right and comparing it to said first vertical sample;

(d) repeating (c) until the next adjacent sample located on the right is different than the first vertical sample, and setting the boundary of the right corners of variant portions of the object;

(e) determining the next adjacent sample located on the left and comparing it to the first vertical sample;

(f) repeating (e) as long as the next adjacent sample is different to the first vertical sample, and setting the left boundary of the left corners of variant portions of the object;

(g) extracting a second horizontal sample of n pixel wide which passes through said middle of the object;

(h) determining the next adjacent sample located upward and comparing it to said second horizontal sample;

(i) repeating (h) until the next adjacent sample located upward is different than said second horizontal sample, and setting the boundary of superior left and right corners of variant portions of the object;

(j) determining the next adjacent sample located downward and comparing it to said second horizontal sample;

(k) repeating (j) as long as the next adjacent sample is different to said second horizontal sample, and setting the boundary of inferior left and right corners of the objects; and (l) using said boundaries to:

derive a first image file corresponding to the superior left corner corresponding to a first variant portion of said object;

derive a second image file corresponding to the superior right corner corresponding to a second variant portion of the image;

derive a third image file corresponding to the inferior left corner corresponding to a third variant portion of said image;

derive a fourth image file corresponding to the inferior right corner corresponding to a fourth variant portion of said image;

derive a fifth image file, corresponding to an invariant n-pixel wide portion of the image located between said superior left and said superior right corners;

derive a sixth image file corresponding to an invariant n-pixel wide portion of the image located between said superior left and said inferior left corners;

derive a seventh image file corresponding to an invariant n-pixel wide portion of the image located between said superior right and said inferior right corners; and derive an eighth image file corresponding to an invariant n-pixel wide portion of the image located between said inferior left and said inferior right corners.

2. Process according to claim 1, further comprising:

displaying a graphical user interface to allow the user to enter a manual determination of the left, right, up and down boundaries of said objects for said image files.

3. Process according to claim 1, further comprising:

constructing an HTML page for displaying the graphic object wherein the graphic object is represented by a table having a cellpadding set to zero, a cellspacing set to zero, a border set to zero, and a first row having a first cell for displaying the first top left corner (111) of said graphic object;

a second cell for displaying the upper vertical portion (116) of a vertical slice of said graphic object;

a third cell for displaying the right top corner (112) of said graphic object;

a second row having
- a first cell for displaying a left portion (115) of a horizontal slice of said graphic object;
- a second cell for displaying the textual information which is to be incorporated within said graphic object;
- a third cell for displaying the right portion (117) of an horizontal slice of said graphic object; and a third row having
- a first cell for displaying the bottom left corner (113) of the graphic object;
- a second cell for displaying the lower portion (118) of a vertical slice of said graphic object; and
- a third cell for displaying the bottom right corner (114) of said graphic object.

4. Process according to claim 3 wherein the second cell of the second row codes the hexadecimal code of the colour of the background of said graphical object.

5. Computer readable medium comprising computer code for executing an active object for returning the HTML page of claim 3.

* * * * *